US010176585B2

(12) United States Patent
Liu

(10) Patent No.: US 10,176,585 B2
(45) Date of Patent: Jan. 8, 2019

(54) METHOD AND ELECTRONIC APPARATUS FOR IMAGE BACKGROUND LEARNING

(71) Applicant: QNAP SYSTEMS, INC., New Taipei (TW)

(72) Inventor: Chan-Cheng Liu, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 0 days.

(21) Appl. No.: 15/436,872

(22) Filed: Feb. 20, 2017

(65) Prior Publication Data

US 2018/0101959 A1 Apr. 12, 2018

(30) Foreign Application Priority Data

Oct. 11, 2016 (TW) .............................. 105132777 A

(51) Int. Cl.
*G06T 7/194* (2017.01)
*G06T 1/60* (2006.01)
*G06N 99/00* (2010.01)

(52) U.S. Cl.
CPC ........... *G06T 7/194* (2017.01); *G06N 99/005* (2013.01); *G06T 1/60* (2013.01); *G06T 2207/10004* (2013.01); *G06T 2207/20081* (2013.01)

(58) Field of Classification Search
CPC . G06T 7/194; G06T 1/60; G06T 2207/20081; G06T 2207/10004; G06N 99/005
See application file for complete search history.

(56) References Cited

U.S. PATENT DOCUMENTS

| 8,009,918 | B2 | 8/2011 | Van Droogenbroeck et al. |
| 2002/0037103 | A1* | 3/2002 | Hong ......................... G06T 7/11 |
| | | | 382/173 |
| 2004/0210796 | A1* | 10/2004 | Largman ............. G06F 11/1417 |
| | | | 714/20 |
| 2005/0188252 | A1* | 8/2005 | Amano ................. G06F 3/0625 |
| | | | 714/6.3 |
| 2007/0001096 | A1* | 1/2007 | Wei ...................... A01B 69/001 |
| | | | 250/208.1 |

(Continued)

OTHER PUBLICATIONS

Wang et al., "Background Subtraction Based on a Robust Consensus Method", 18th International Conference on Pattern Recognition (ICPR'06), Aug. 2006, pp. 1-4.

*Primary Examiner* — Ming Y Hon
(74) *Attorney, Agent, or Firm* — JCIPRNET

(57) ABSTRACT

A method and an electronic apparatus for image background learning are provided. In the method, a memory space for recording multiple historical background values of each pixel in an input image is disposed in a memory device, in which the memory space is divided into a lock area and an open area. Whenever receiving the input image, a processor determines whether each pixel in the input image is a background pixel according to the historical background values recorded in the memory space. If the pixel is determined as the background pixel, the processor updates one of the historic background values recorded in the open area by using the pixel value of the pixel while keeping the historical background values in the lock area unchanged. The processor also periodically switches a location of the lock area in the memory space, so as to forget old historical background values.

8 Claims, 10 Drawing Sheets

(56) References Cited

U.S. PATENT DOCUMENTS

| | | | |
|---|---|---|---|
| 2007/0188290 A1* | 8/2007 | Nakasuji | H01H 36/0066 337/1 |
| 2008/0310729 A1* | 12/2008 | Yoshino | G06K 9/4671 382/194 |
| 2009/0319734 A1* | 12/2009 | Aihara | G06F 11/1441 711/161 |
| 2010/0208998 A1* | 8/2010 | Van Droogenbroeck | G06K 9/38 382/195 |
| 2013/0136350 A1* | 5/2013 | Pai | G06T 7/11 382/165 |
| 2015/0092210 A1* | 4/2015 | Tsugimura | H04N 1/41 358/1.13 |

* cited by examiner

METHOD AND ELECTRONIC APPARATUS FOR IMAGE BACKGROUND LEARNING

CROSS-REFERENCE TO RELATED APPLICATION

This application claims the priority benefit of Taiwan application serial no. 105132777, filed on Oct. 11, 2016. The entirety of the above-mentioned patent application is hereby incorporated by reference herein and made a part of this specification.

BACKGROUND

Field of the Invention

The invention is directed to a method and an apparatus for image processing and more particularly, to a method and an electronic apparatus for image background learning.

Description of Related Art

In a background learning technique, a plurality of images obtained by capturing the same scene is analyzed and thereby, a background model of the scene is obtained. The background model may be used to distinguish a foreground and a background of subsequently captured images, so that the processed images may be used in various applications, such as movement detection, pedestrian detection and so on.

FIG. 1 and FIG. 2 are schematic diagrams illustrating conventional background learning techniques. Referring to FIG. 1, in an algorithm of the conventional background learning technique, a stable background model 10 is obtained through learning a plurality of images, and the background model 10 includes an object 102. Assuming an input image 12 includes a new object 104, the input image 12 is compared with the background model 10 by the algorithm, so as to output a foreground mask image 14. The foreground mask image 14 includes an object 106 which is labeled as a foreground and represents a moving foreground.

Then, referring to FIG. 2, when performing the background learning, the algorithm may dispose a memory space capable of storing historic values for each pixel in the input image. For example, a memory space 22 capable of recording 10 historic values is disposed for an $i^{th}$ pixel 202 in a $t^{th}$ image 20 illustrated in FIG. 2. Then, the algorithm compares the pixel value of the pixel 202 with each historical values in the memory space, so as to determine whether they match each other. If they match each other, the algorithm marks the pixel 202 as a background pixel, and updates one of the historic values in the memory space 22 by using the pixel value of the pixel 202. When performing the updating operation, the algorithm, for example, adopts a sequential updating method to sequentially update the historic values in the memory space 22 by using the pixel value of the pixel that is newly determined as the background pixel, or adopts a random updating method to randomly update any one of the historic values in the memory space 22 by using the pixel value of the pixel that is newly determined as the background pixel.

However, the background in an actual scene is not imaginarily stable, which may be influenced by image coding errors, and even some minor changes (e.g., a slightly shaking leaf, signboard and so on) in the scene may cause foreground noise. Thus, the background memory has to be sufficient for the conventional background learning technique to identify such interference. However, if the background memory is not adaptively adjusted (e.g. a length of the memory is too long), an object of interest may be mistakenly considered as the background and then ignored.

SUMMARY

The invention is directed to a method and an electronic apparatus for image background learning, capable of facilitating a background learning technique to be applicable for a variety of scenes through adjusting background memory.

According to an embodiment of the invention, a method for image background learning, adapted for an electronic apparatus having a memory device and a processor, is provided. In the method, a memory space for recording a plurality of historical background values of each of a plurality of pixels in an input image is disposed in the memory device, in which the memory space is divided into a lock area and an open area. When receiving the input image, the processor determines whether each pixel in the input image is a background pixel according to the historical background values recorded in the memory space. If the pixel is determined as the background pixel, the processor updates one of the historic background values recorded in the open area by using the pixel value of the pixel while keeping the historical background values in the lock area unchanged. Additionally, the processor also periodically switches a location of the lock area in the memory space.

In an embodiment of the invention, the step of determining whether each pixel in the input image is the background pixel includes calculating a similarity between the pixel value of the pixel and each of the historical background values in the memory space, determining whether the number of the pixels having the similarity less than a first threshold is greater than a second threshold, and determining the pixel as the background pixel if the number is greater than the second threshold.

In an embodiment of the invention, when the pixel is determined as the background pixel, the method further includes determining whether a minimum similarity among the similarities between the pixel value of the pixel and each of the historical background values in the memory space is less than a third threshold, and not updating the one of the historical background values in the open area by using the pixel value of the pixel if the minimum similarity is less than the third threshold.

In an embodiment of the invention, the step of updating the one of the historical background values in the open area by using the pixel value of the pixel includes sequentially or randomly selecting one of the historical background values in the open area to update.

In an embodiment of the invention, the step of periodically switching the location of the lock area in the memory space includes switching the lock area forward or backward from a current address section in the memory space to a next address section in the memory space, in which the current address section and the next address section overlap or do not overlap.

According to an embodiment of the invention, an electronic apparatus including an image capturing device, a memory device, a storage device and a processor is provided. The image capturing device is configured to receive an input image. The storage circuit is configured to store a plurality of modules. The processor is coupled with the image capturing device, the memory device and the storage device and configured to load and execute the modules stored in the storage device. The modules include a memory space disposing module, a background pixel determining module and a pixel value updating module. The memory space disposing module is configured to dispose a memory space for recording a plurality of historical background values of each pixel in the input image in the memory device, in which the memory space is divided into a lock area and an open area. The memory space disposing module is configured to periodically switch a location of the lock area in the memory space. The background pixel determining module is configured to determine whether each pixel in the input image is a background pixel according to the historical background values recorded in the memory space when the image capturing device receives an input image. The pixel value updating module is configured to update one of the historic background values recorded in the open area by using the pixel value of the pixel while keeping the historical background values in the lock area unchanged when the background pixel determining module determines the pixel as the background pixel.

In an embodiment of the invention, the background pixel determining module calculates a similarity between the pixel value of the pixel and each of the historical background values in the memory space, determines whether the number of the pixels having the similarity less than a first threshold is greater than a second threshold, and determines the pixel as the background pixel if the number is greater than the second threshold.

In an embodiment of the invention, the background pixel determining module further determines whether a minimum similarity among the similarities between the pixel value of the pixel and each of the historical background values in the memory space is less than a third threshold, and the pixel value updating module does not update the one of the historical background values by using the pixel value of the pixel when the background pixel determining module determines the minimum similarity as being less than the third threshold.

In an embodiment of the invention, the pixel value updating module sequentially or randomly selects one of the historical background values in the open area to update.

In an embodiment of the invention, the memory space disposing module switches the lock area forward or backward from a current address section in the memory space to a next address section in the memory space, in which the current address section and the next address section overlap or do not overlap.

To sum up, in the method and the electronic apparatus for image background learning of the invention, a memory space is disposed for each pixel in the input image, so as to store the historical background values of the pixel. When the background memory is updated, the memory space is divided into the lock area and the open area, in which only the open area is provided for the update operation, but the lock area is unchanged, so as to keep the memory. Additionally, in the invention, the location of the lock area is further periodically switched in the memory space, so as to forget old memory.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the present invention.

DESCRIPTION OF EMBODIMENTS

In the invention, a background memory space for storing previous background pixel values is disposed for each pixel in an input image, and the memory space is further divided into two parts, i.e., a lock area and an open area. When the background memory is updated, only the open area is available for the update operation, but the lock area is unchanged, so as to save the memory. After a period of time, the lock area and the open area are alternated or transferred according to a predetermined rule in the invention, such that the old background can be forgotten, and a new background can be memorized.

Figure 1:
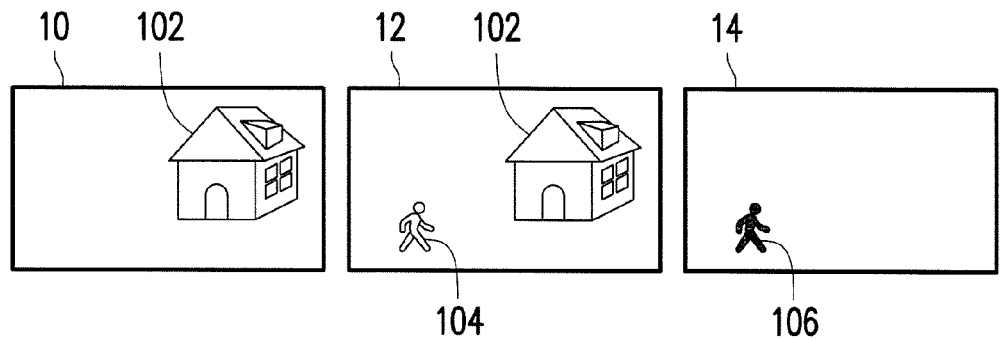
FIG. 1 is a schematic view illustrating a conventional background learning technique.
Figure 2:
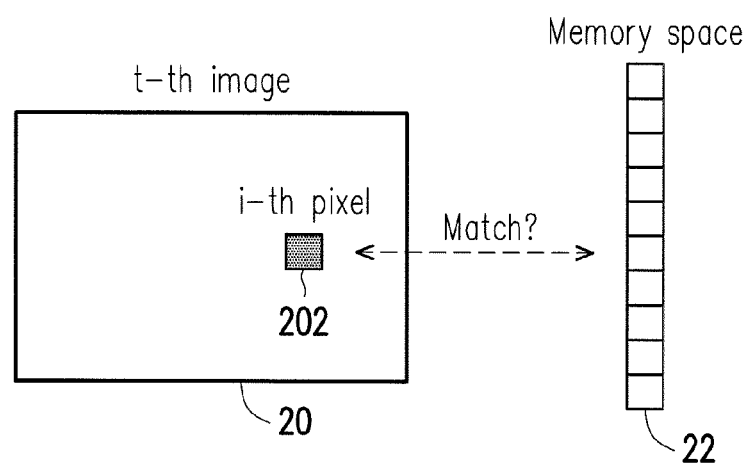
FIG. 2 is a schematic view illustrating a conventional background learning technique.
Figure 3:
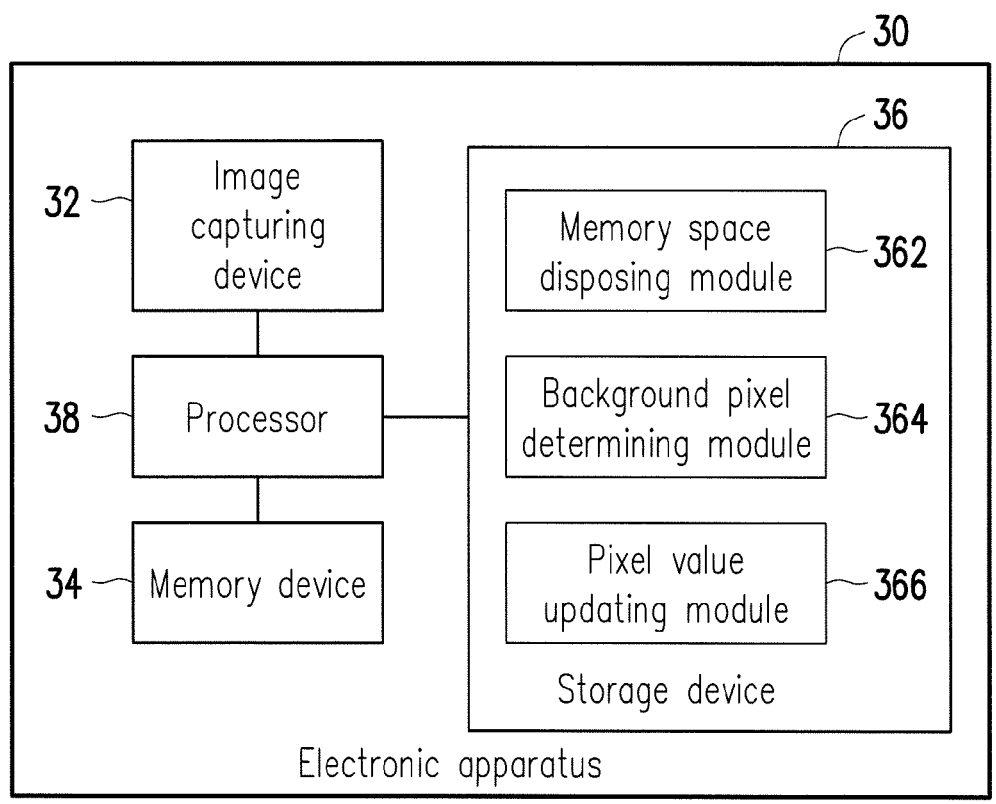
FIG. 3 is a block diagram illustrating an electronic apparatus for image background learning according to an embodiment of the invention.

FIG. 3 is a block diagram illustrating an electronic apparatus for image background learning according to an embodiment of the invention. Referring to FIG. 3, an electronic apparatus 30 of the present embodiment is a computation apparatus with computation capability, such as a server, a workstation or a personal computer (PC), an image capturing apparatus, such as a digital camera or a digital video camcorder (DVC), or a portable electronic apparatus, such as a cell phone or a tablet computer, which may be configured for background learning for a captured image, but the type of the electronic apparatus 30 is not limited in the present embodiment. The electronic apparatus 30 includes an image capturing device 32, a memory device 34, a storage device 36 and a processor 38, and capabilities thereof will be described as follows.

The image capturing device 32 is, for example, a camera including a photosensitive device, such as a charge coupled device (CCD) or a complementary metal-oxide semiconductor (CMOS) device, and configured to capture an image. In other embodiments, the image capturing device 32 may also be a card reader for retrieving an image from a memory card or a wired or wireless network card or any other communication device for retrieving an image from a network apparatus, but the present embodiment is not limited thereto.

The memory device 34 is, for example, a random access memory (RAM), a flash memory or the like or a combination thereof, which is configured to store historical background values of pixels of an input image.

The storage device 36 is, for example, any type of fixed or movable RAM, read only memory (ROM), flash memory, hardware or the like or a combination thereof In the present embodiment, the storage device 36 is configured to record a memory space disposing module 362, a background pixel determining module 364 and a pixel value updating module 366. The modules are, for example, computer programs stored in the storage device 36. In an embodiment, the memory device 34 may be a portion of the storage device 36, which is not limited herein.

The processor 38 may be, for example, a central processing unit (CPU) or any other programmable microprocessor for general or special use, a digital signal processor (DSP), a programmable controller, an application specific integrated circuit (ASIC), a programmable logic device (PLD) or other similar devices, or a combination of these devices. The processor 38 is coupled with the image capturing device 32, the memory device 34 and the storage device 36, and configured to load computer programs of the memory space disposing module 362, the background pixel determining module 364 and the pixel value updating module 366 from the storage device 36 and accordingly, perform a method for image background learning of an embodiment of the application. An embodiment is provided hereinafter to describe detailed steps of the method.

Figure 4:
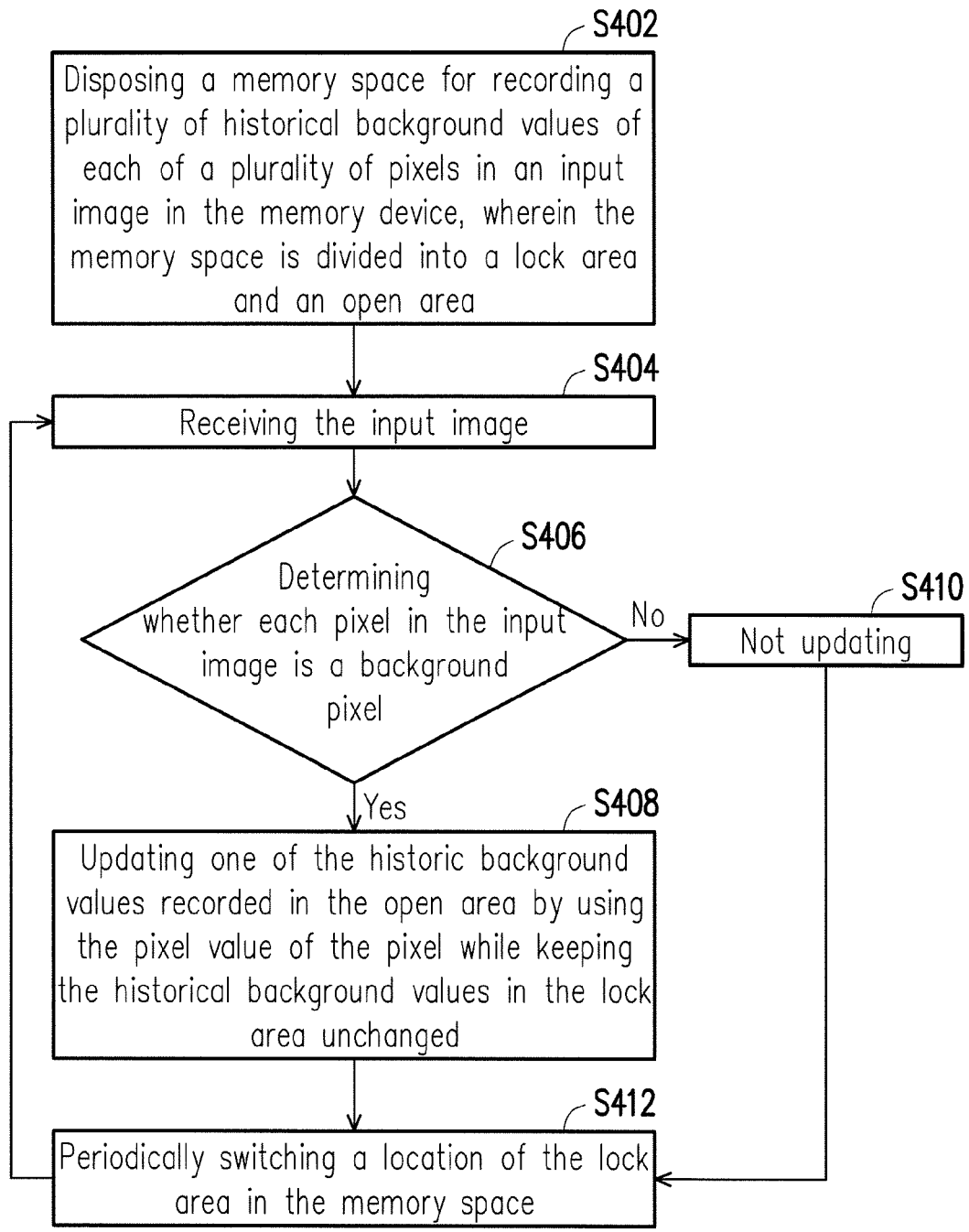
FIG. 4 is a flowchart illustrating a method for image background learning according to an embodiment of the invention.

FIG. 4 is a flowchart illustrating a method for image background learning according to an embodiment of the invention. Referring to FIG. 3 and FIG. 4, the method of the present embodiment is adapted for the aforementioned electronic apparatus 30, and detailed steps of the method for image background learning of the present embodiment will be described with reference to each device of the electronic apparatus 30.

First, the memory space disposing module 362 disposes a memory space for recording historical background values of each pixel in an input image in the memory device 34, in which the memory space is divided into a lock area and an open area (step S402). The numbers and lengths of the lock area and the open area may be adaptively arranged based on demands, and a total length thereof is equal to a length of the memory space.

After the memory space is disposed, the image capturing device 32 receives the input image (step S404). Whenever the image capturing device 32 receives the input image, the background pixel determining module 364 determines whether each pixel in the input image is a background pixel according to the historical background values recorded in the memory space (step S406). Therein, the background pixel determining module 364, for example, calculates a similarity between a pixel value of each pixel and each of the historical background values, so as to determine whether the pixel is the background pixel.

Specifically, for each pixel in the input image, the background pixel determining module 364 calculates the similarity between the pixel value of the pixel and each of the historical background values in the memory space, for example. Thereafter, the background pixel determining module 364 determines whether the number of the pixels having the similarity less than a first threshold among the calculated similarities is greater than a second threshold. The first threshold is, for example, 10, and the second threshold is, for example, 2, which are determined by a user based on demands, without being limited herein. If the aforementioned number is greater than the second threshold, the background pixel determining module 364 determines the pixel as a background pixel.

In step S406, if the background pixel determining module 364 determines the pixel as the background pixel, the pixel value updating module 366 updates one of the historical background values in the open area by using the pixel value of the pixel and keeps the historical background values in the lock area unchanged (step S408). The pixel value updating module 366, for example, sequentially or randomly selects one of the historical background values recorded in the open area to update, but the invention is not limited thereto. It should be noted that the pixel value updating module 366 does not change the historical background values in the lock area during the process of updating the historic background values in the open area. Thereby, the background memory in the lock area may be saved, without being removed and causing foreground noise due to the memory space being updated for several times.

On the other hand, if the background pixel determining module 364 determines the pixel as not the background pixel, the pixel value updating module 366 does not update by using the pixel value of the pixel (step S410).

It should be noted that in another embodiment, when determining the pixel as the background pixel, the background pixel determining module 364 further determines whether a minimum similarity among the similarities between the pixel value of the pixel and each of the historical background values in the memory space is less than a third threshold. The third threshold is, for example, 5, which may be determined by the user based on demands, without being limited herein. If the background pixel determining module 364 determines the minimum similarity as being less than the third threshold, the pixel value updating module 366 also does not update the historical background values in the open area by using the pixel value of the pixel.

After the pixel value updating module 366 completes the updating of the pixels, or determines not to update according to the determination decision of the background pixel determining module 364, the memory space disposing module 362 periodically switches a location of the lock area in the memory space (step S412). The locations of the lock area and the open area in the memory space are alternated or transferred according to a predetermined rule, so as to forget the old background information and memorize new background information.

Specifically, the memory space disposing module 362 switches the lock area forward or backward, for example, from a current address section in the memory space to a next address section, in which the current address section and the next address section may overlap or may not. Briefly speaking, as long as part of the pixels are moved out of the lock area, the originally locked historical background values may be probably updated, and in this way, the old background information recorded in the lock area may be forgotten through the movement.

The final process flow returns to step S404, where the image capturing device 32 continues to receive a next image, and steps S406 to S412 are repeated until no input image is received.

Figure 5:
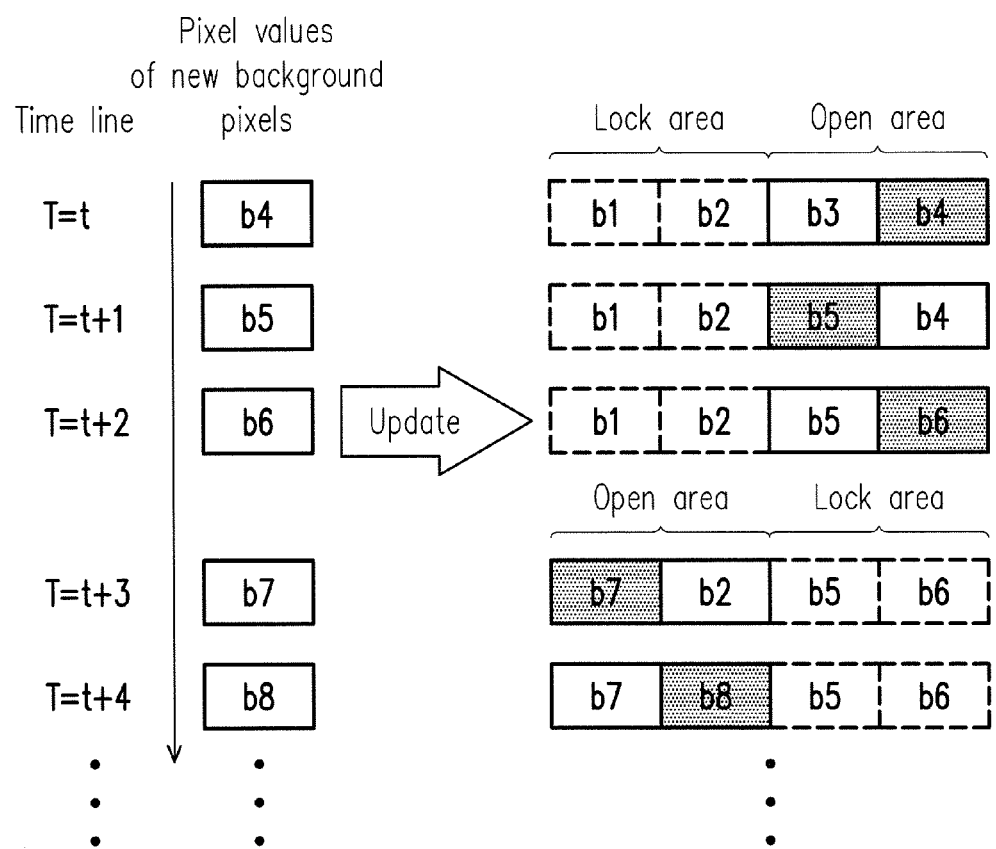
FIG. 5 illustrates an example of the method for image background learning according to an embodiment of the invention.

For example, FIG. 5 illustrates an example of the method for image background learning according to an embodiment of the invention. Referring to FIG. 5, a memory space configured to record pixel values of new background pixels is disposed in the memory device of the electronic apparatus in the present embodiment, in which the memory space is divided into a lock area and an open area. For descriptive convenience, it is assumed that each of the lock area and the open area includes a memory space of two pixels, which is capable of recording the pixel values of two pixels. As the time T proceeds from t to (t+2), pixel values b4 to b6 of the new background pixels determined by the electronic apparatus are sequentially filled in the open area, while historical background values in the lock area are kept unchanged. When the time T is at (t+3), the lock area and the open area are alternated with each other, such that when the time T proceeds from (t+3) to (t+4), pixel values b7 and b8 of the new background pixels determined by the electronic apparatus may be sequentially filled in the open area after being alternated, while the historical background values in the lock area after being alternated is kept unchanged. By the method, the old historical background values may be adaptively saved in the lock area, the number saved thereby may be determined according to the length of the lock area, and a time length of saving the old historical background values may be determined by a switching cycle of the lock area.

It is to be mentioned that the lock area of the aforementioned embodiment occupies, for example, a current address section in the memory space. When the electronic apparatus periodically switches the lock area, the lock area is switched forward or backward from the current address section to the next address section in the memory space. If the address section after being switched exceeds a start address or an end address in the memory space, the start address and the end address of the memory space may be connected together, such that the location of the lock area, when being switched to one end point, may be continuously connected to the other end point in the memory space. It is to be mentioned that the memory space may include not only one lock area, but also a plurality of lock areas, and the lock areas before and after being switched may overlap or may not overlap.

Figure 6A:
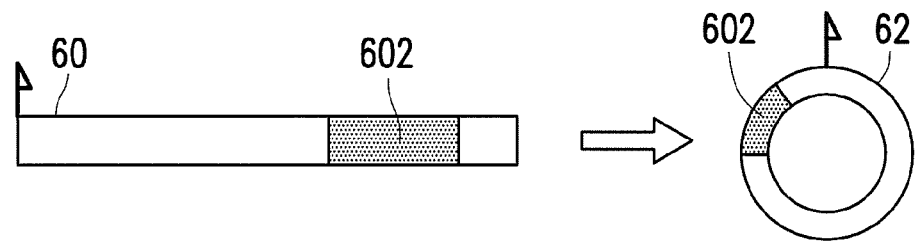
FIG. 6A and FIG. 6B illustrate examples of the lock area in the memory space according to an embodiment of the invention.
Figure 6B:
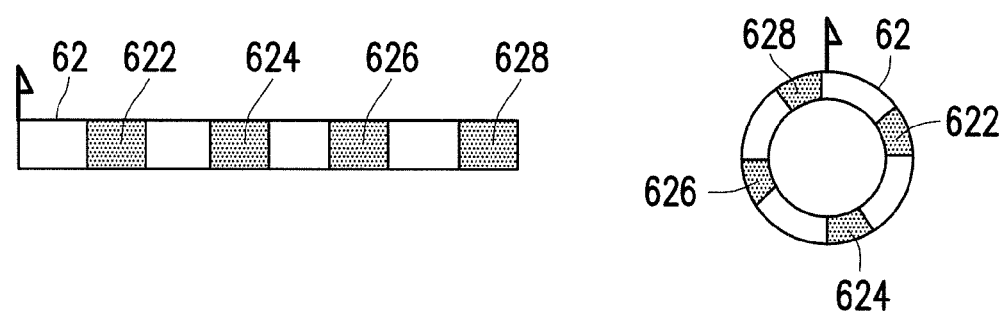

For example, FIG. 6A and FIG. 6B illustrated examples of the lock area in the memory space according to an embodiment of the invention. Herein, a memory space 60 illustrated in FIG. 6A includes only one lock area 602. If a start address and an end address of the memory space 60 are connected together, a schematic positional diagram illustrating the lock area 602 on the right with respect to the memory space 60 may be obtained. On the other hand, a memory space 62 illustrated in FIG. 6B includes a plurality of lock areas 622, 624, 626 and 628. If a start address and an end address of the memory space 62 are connected together, a schematic positional diagram illustrating the lock areas 622, 624, 626 and 628 on the right with respect to the memory space 62 may be obtained.

Figure 7A:
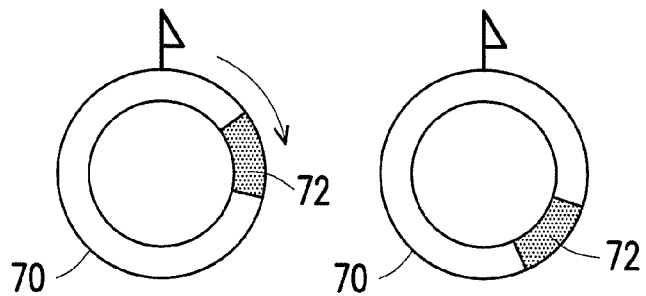
FIG. 7A to FIG. 7D illustrate examples of switching the lock area in the memory space according to an embodiment of the invention.
Figure 7B:
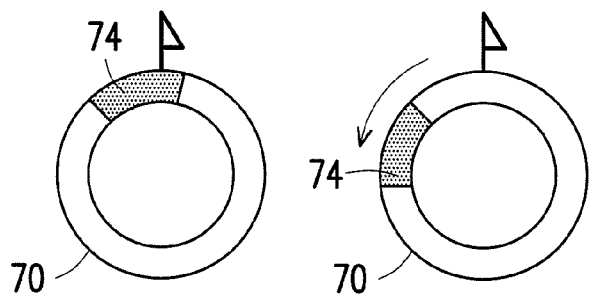
Figure 7C:
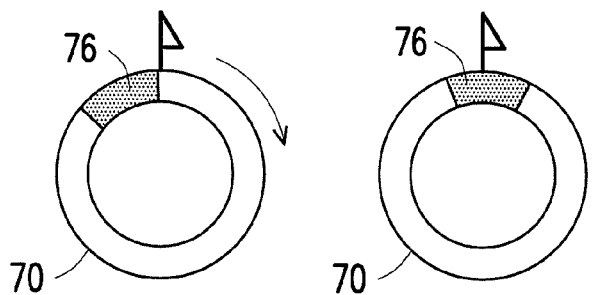
Figure 7D:
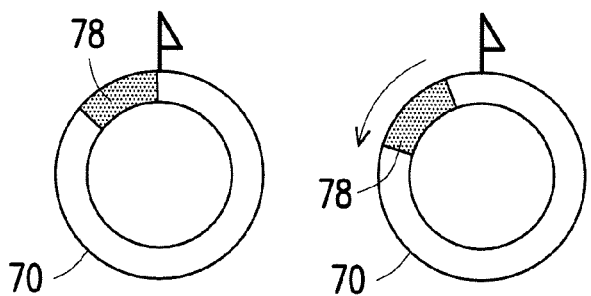

On the other hand, FIG. 7A to FIG. 7D illustrate examples of switching the lock area in the memory space according to an embodiment of the invention. Therein, FIG. 7A illustrates an example of forward switching without overlapping, where a lock area 72 is switched in a clockwise direction in a memory space 70, and an address section of the lock area 72 after being switched does not overlap an address section of the lock area 72 before being switched. FIG. 7B illustrates an example of reverse switching without overlapping, where a lock area 74 is switched in a counterclockwise direction in the memory space 70, and likewise, an address section of the lock area 74 after being switched does not overlap an address section of the lock area 74 before being switched. FIG. 7C illustrates an example of forward switching with overlapping, where a lock area 76 is switched in a clockwise direction in the memory space 70, and an address section of the lock area 76 after being switched partially overlaps an address section of the lock area 76 before being switched. FIG. 7D illustrates an example of reverse switching with overlapping, where a lock area 78 is switched in a counterclockwise direction in the memory space 70, and an address section of the lock area 78 after being switched partially overlaps an address section of the lock area 78 before being switched.

Two practical examples are provided below to describe the applicable range of the invention and compare the invention with the sequential updating method and the random updating method of the related art.

Figure 8A:
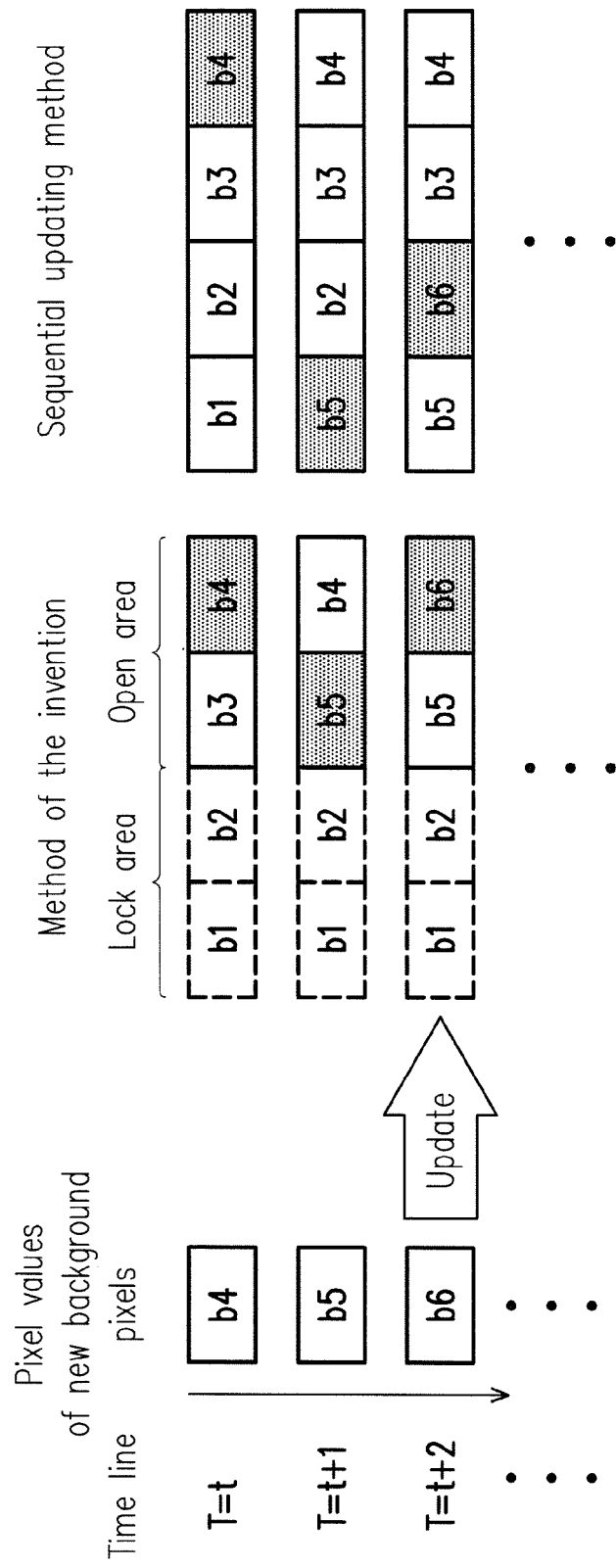
FIG. 8A and FIG. 8B illustrate an example of the method for image background learning according to an embodiment of the invention.
Figure 8B:
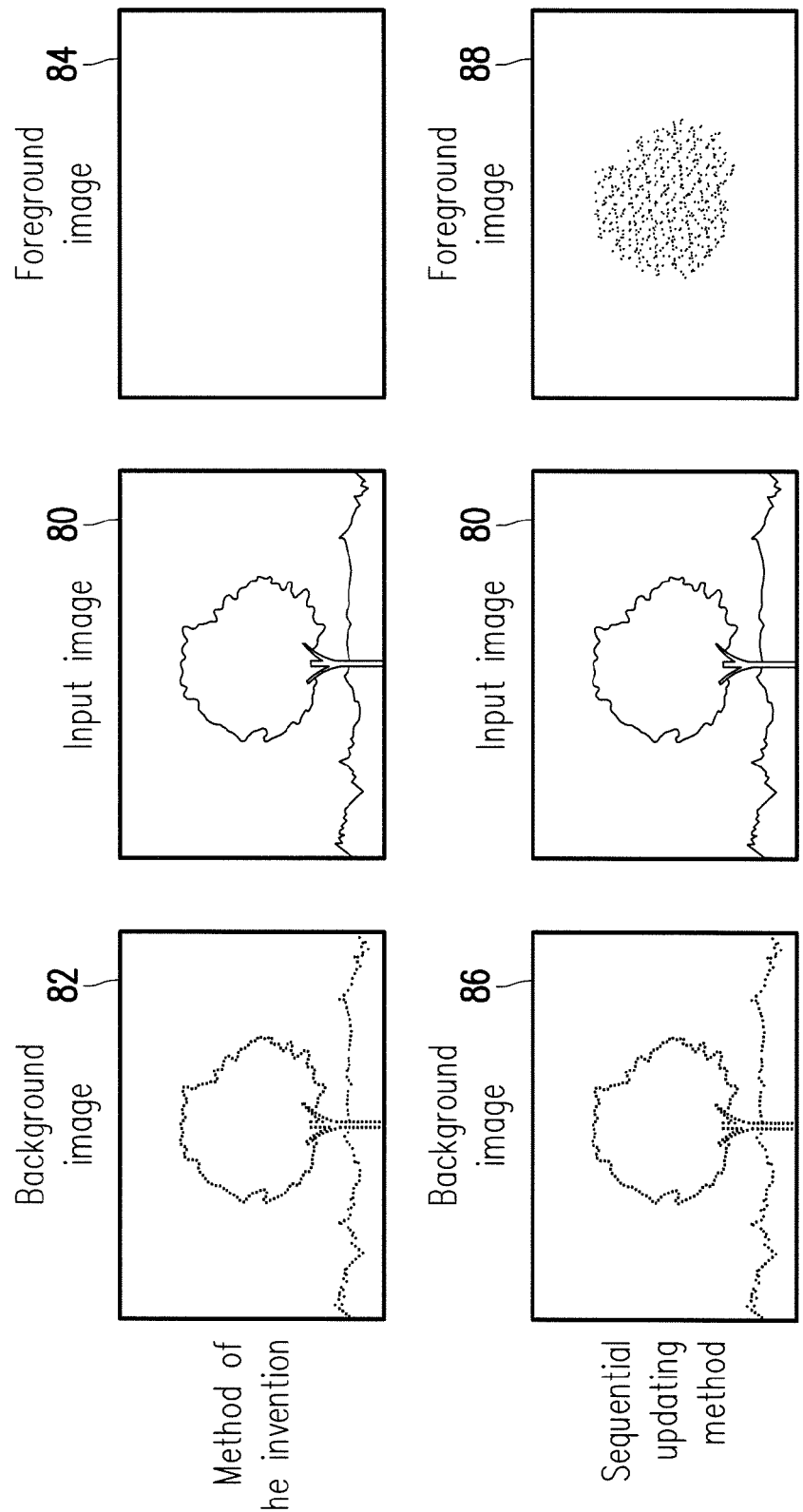

FIG. 8A and FIG. 8B illustrate examples of the method for image background learning according to an embodiment of the invention. The example of the method of the invention illustrated in FIG. 8A is the same as the example of the scenario when the time T proceeds from t to (t+2) illustrated in FIG. 5, namely, the pixel values b4 to b6 of the new background pixels determined by the electronic apparatus are sequentially filled in the open area, while the historical background values in the lock area is kept unchanged. The conventional sequential updating method is illustrated on the right of FIG. 8A, in which the memory space is not divided into the lock area and the open area, and the pixel values b4 to b6 of the new background pixels determined by the electronic apparatus are sequentially filled in the memory space. By comparing the method of the invention and the conventional sequential updating method, when the time T is at (t+2), the method of the invention achieves saving the previous pixel values of the background pixels by using the lock area, but in the sequential updating method, the pixel values b1 and b2 have been forgotten.

Difference between detected foregrounds obtained by the two methods may be learned according to the images illustrated in FIG. 8B. The method of the invention uses the lock area with a long switching cycle, which renders a background image 82 to be capable of memorizing background difference generated after a leave shaking scene occurs, and after the background image 82 is compared with an input image 80, a clean foreground image 84 may be obtained. On the other hand, the memory time used by the sequential updating method is short, such that minor background difference is removed, which results in noise appearing in the foreground image 84.

Figure 9A:
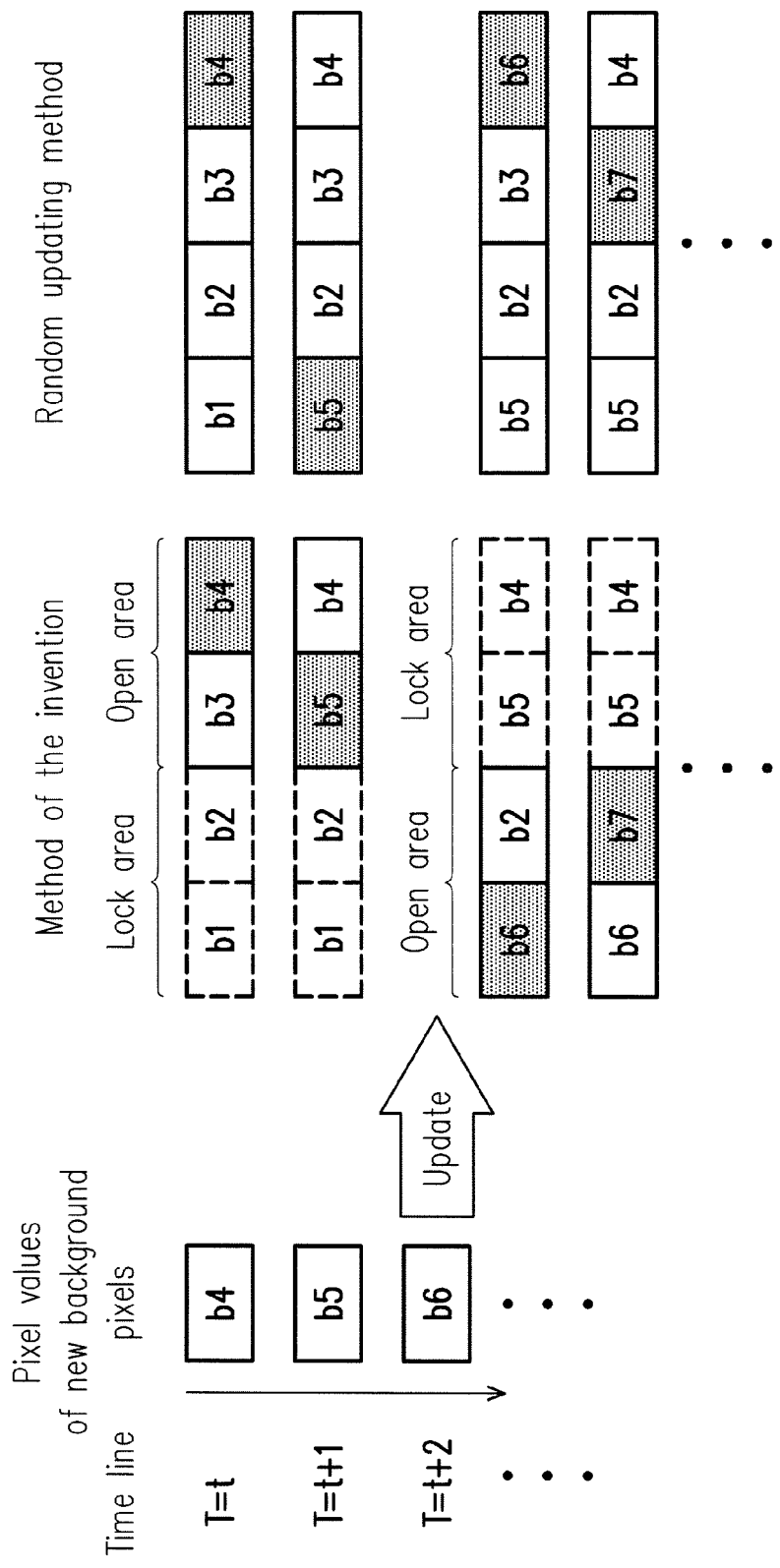
FIG. 9A and FIG. 9B illustrate an example of the method for image background learning according to an embodiment of the invention.
Figure 9B:
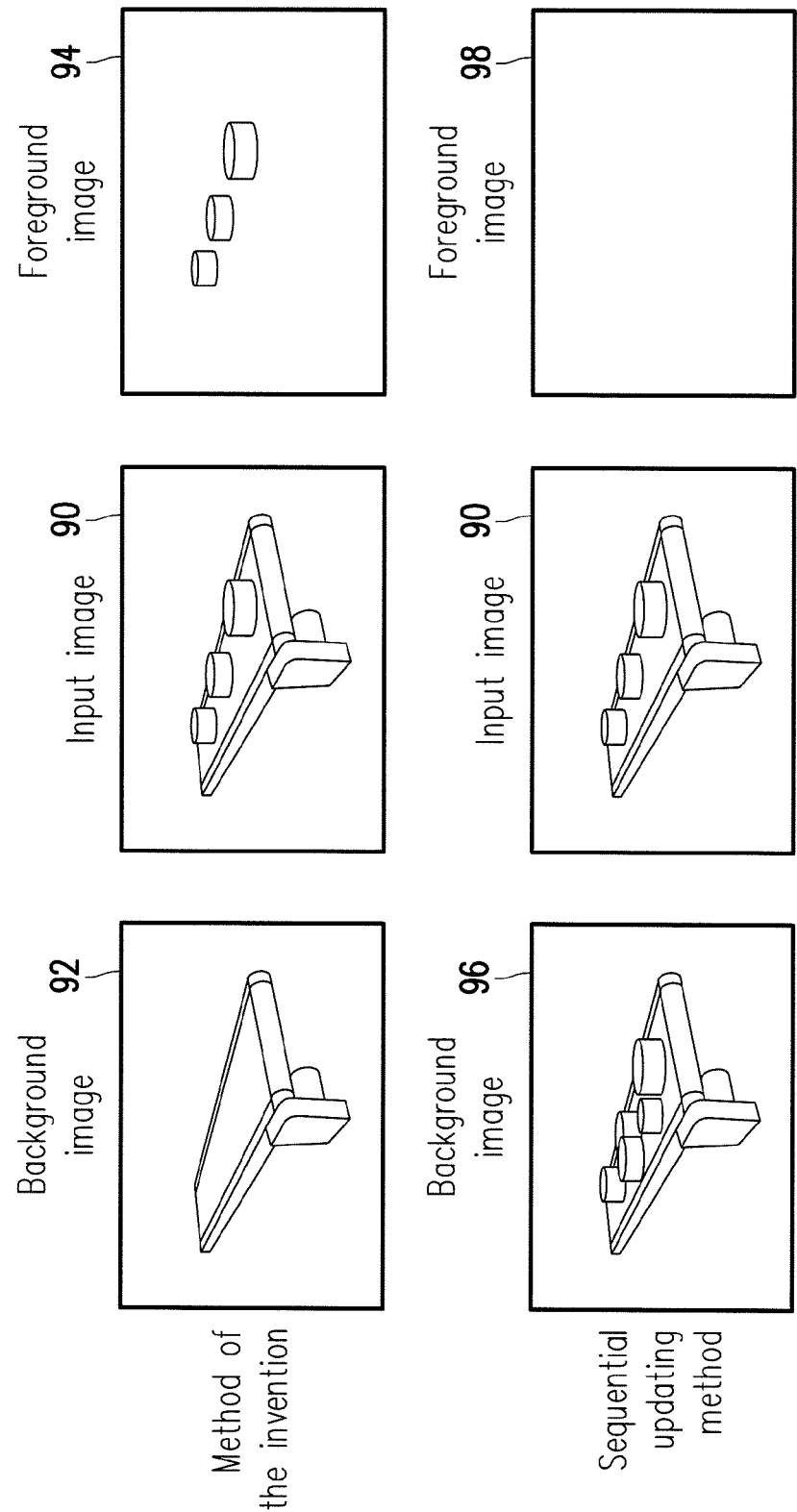

FIG. 9A and FIG. 9B illustrate examples of the method for image background learning according to an embodiment of the invention. In the method of the invention illustrated in FIG. 9A, when the time T proceeds from t to (t+1), the pixel values b4 and b5 of the new background pixels determined by the electronic apparatus are sequentially filled in the open area, while the historical background values in the lock area are kept unchanged. Then, the lock area and the open area are alternated with each other, such that the pixel values b6 and b7 of the new background pixels determined by the electronic apparatus are sequentially filled in the open area after being alternated, while the historical background values in the lock area after being alternated are kept unchanged. The conventional random updating method is illustrated on the right of FIG. 9A, in which the memory space is not divided into the lock area and the open area, and the pixel values b4 and b5 of the new background pixels determined by the electronic apparatus are sequentially filled in any positions in the memory space. By comparing the method of the invention and the conventional random updating method, when the time T is at (t+2), the method of the invention uses a short switching period of the lock area to forget the old memory, but the random updating method needs a longer time to forget the old memory (e.g., the pixel value b2).

Difference between detected foregrounds obtained by the two methods may be learned according to the images illustrated in FIG. 9B. The method of the invention uses the lock area with a short switching cycle, which renders a background image 92 to be capable of forgetting an intermittently appearing object to generate a foreground, and after the background image 92 is compared with an input image 90, a foreground image 94 with the object may be obtained. On the other hand, the memory time used by the random updating method is long, such that the intermittently appearing object is synthesized into the background and disappears from the foreground image 98.

Based on the above, in the method and the electronic apparatus for image background learning of the invention, the memory space disposed for each pixel in the input image is divided into the lock area and the open area, and when the background memory is updated, only the open area is available for the update operation, but the lock area is kept unchanged, so that the memory in the lock area is saved. In the invention, the location of the lock area in the memory space can also be periodically switched or transferred, such that the old background can be forgotten, and the new background can be memorized. In this way, the method of background learning provided by the invention can be applicable for a variety of scenes.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A method for image background learning, adapted for an electronic apparatus having a memory device and a processor, the method comprising:
   disposing a memory space for recording a plurality of historical background values of each of a plurality of pixels in an input image in the memory device, wherein the memory space is divided into a lock area and an open area;
   determining whether each pixel in the input image is a background pixel according to the historical background values recorded in the memory space by the processor when receiving the input image;
   if the pixel is determined as the background pixel, updating one of the historic background values recorded in the open area by using the pixel value of the pixel while keeping the historical background values in the lock area unchanged so as to save the memory space; and
   periodically switching a location of the lock area in the memory space according to a predetermined rule so as to update the background information,
   wherein the step of periodically switching the location of the lock area in the memory space comprises:
   switching the lock area forward or backward from a current address section in the memory space to a next address section in the memory space, wherein the current address section and the next address section overlap or do not overlap.

2. The method according to claim 1, wherein the step of determining whether each pixel in the input image is the background pixel comprises:
   calculating a similarity between the pixel value of the pixel and each of the historical background values in the memory space;
   determining whether the number of the pixels having the similarity less than a first threshold is greater than a second threshold; and
   if the number is greater than the second threshold, determining the pixels as the background pixels.

3. The method according to claim 2, wherein when the pixel is determined as the background pixel, the method further comprises:
   determining whether a minimum similarity among the similarities between the pixel value of the pixel and each of the historical background values in the memory space is less than a third threshold; and
   if the minimum similarity is less than the third threshold, not updating the one of the historical background values in the open area by using the pixel value of the pixel.

4. The method according to claim 1, wherein the step of updating the one of the historical background values in the open area by using the pixel value of the pixel comprises:
   sequentially or randomly selecting one of the historical background values in the open area to update.

5. An electronic apparatus, comprising:
   an image capturing device, receiving an input image;
   a memory device;
   a storage device, storing a plurality of modules; and
   a processor, coupled with the image capturing device, the memory device and the storage device, and loading and executing the modules stored in the storage device, wherein the modules comprise:
   a memory space disposing module, disposing a memory space for recording a plurality of historical background values of each of a plurality of pixels in the input image in the memory device, wherein the memory space is divided into a lock area and an open area, and the memory space disposing module periodically switches a location of the lock area in the memory space according to a predetermined rule so as to update the background information;
   a background pixel determining module, determining whether each pixel in the input image is a background pixel according to the historical background values recorded in the memory space whenever the image capturing device receives the input image; and
   a pixel value updating module, updating one of the historic background values recorded in the open area by using the pixel value of the pixel while keeping the historical background values in the lock area unchanged so as to save the memory space when the background pixel determining module determines the pixel as the background pixel,
   wherein the memory space disposing module switches the lock area forward or backward from a current address section in the memory space to a next address section in the memory space, wherein the current address section and the next address section overlap or do not overlap.

6. The electronic apparatus according to claim 5, wherein the background pixel determining module calculates a similarity between the pixel value of the pixel and each of the historical background values in the memory space and determines whether the number of the pixels having the similarity less than a first threshold is greater than a second threshold, and determines the pixel as the background pixel if the number is greater than the second threshold.

7. The electronic apparatus according to claim 6, wherein the background pixel determining module further determines whether a minimum similarity among the similarities between the pixel value of the pixel and each of the historical background values in the memory space is less than a third threshold, and the pixel value updating module does not update the one of the historical background values by using the pixel value of the pixel when the background pixel determining module determines the minimum similarity as being less than the third threshold.

8. The electronic apparatus according to claim 5, wherein the pixel value updating module sequentially or randomly selects one of the historical background values in the open area to update.

\* \* \* \* \*